United States Patent [19]

Koshiga et al.

[11] 4,107,503
[45] Aug. 15, 1978

[54] METHOD FOR ELIMINATING RESIDUAL MAGNETISM IN PIPE-BLANK FOR WELDED STEEL PIPE LONGITUDINALLY SEAM-WELDED FROM INSIDE

[75] Inventors: Fusao Koshiga, Kawasaki; Jinkichi Tanaka, Yokohama; Itaru Watanabe, Yokohama; Motoaki Suzuki, Yokohama; Toshifumi Kojima, Yokohama; Hiroyoshi Matsubara, Fukuyama; Tatsumi Osuka, Fukuyama; Kenji Takeshige, Fukuyama; Takashi Nagamine, Fukuyama; Osamu Hirano, Fukuyama, all of Japan

[73] Assignee: Nippon Kokan Kabushiki Kaisha, Tokyo, Japan

[21] Appl. No.: 776,235

[22] Filed: Mar. 10, 1977

[30] Foreign Application Priority Data

Apr. 6, 1976 [JP] Japan .................................. 51-37825

[51] Int. Cl.² ............................................. B23K 31/06
[52] U.S. Cl. ...................................... 219/61; 219/123
[58] Field of Search ................. 219/123, 137 R, 61; 361/149

[56] References Cited

U.S. PATENT DOCUMENTS

| | | | |
|---|---|---|---|
| 1,947,077 | 2/1934 | Chapman | 219/123 |
| 2,152,194 | 3/1939 | Jones | 219/123 |
| 2,564,396 | 8/1951 | Darner | 219/61 |
| 2,677,802 | 5/1954 | Irwin | 361/149 |

FOREIGN PATENT DOCUMENTS

| | | | |
|---|---|---|---|
| 149,840 | 11/1961 | U.S.S.R. | 219/61 |
| 279,828 | 11/1970 | U.S.S.R. | 219/123 |
| 297,243 | 12/1971 | U.S.S.R. | 219/123 |

*Primary Examiner*—J. V. Truhe
*Assistant Examiner*—Clifford C. Shaw
*Attorney, Agent, or Firm*—Flynn & Frishauf

[57] ABSTRACT

After longitudinally seam-welding a pipe-blank for welded steel pipe from the inside along a groove by the arc welding process which comprises using direct electric current supplied to a consumable electrode through a cable as the welding current, the polarity of said consumable electrode applied for said longitudinal seam-welding is switched over to the opposite polarity, an arc from said consumable electrode is ignited again on a tab plate attached to the end of said pipe-blank on the completion side of said longitudinal seam-welding to cause a direct electric current for eliminating magnetism to flow through said cable in the opposite direction to that of said direct electric current for welding, thereby eliminating residual magnetism in said pipe-blank produced by said direct electric current for welding flowing through said cable introduced into said pipe-blank during said longitudinal seam-welding.

7 Claims, 7 Drawing Figures

METHOD FOR ELIMINATING RESIDUAL MAGNETISM IN PIPE-BLANK FOR WELDED STEEL PIPE LONGITUDINALLY SEAM-WELDED FROM INSIDE

FIELD OF THE INVENTION

The present invention relates to a method, in longitudinally seam-welding a pipe-blank for welded steel pipe from the inside along a groove by the arc welding process, comprising using direct electric current supplied through a cable as the welding current, for eliminating a residual magnetism in said pipe-blank produced by said direct electric current for welding flowing through said cable introduced into said pipe-blank.

BACKGROUND OF THE INVENTION

Conventionally, in longitudinal seam-welding, for manufacturing a welded steel pipe, the groove of an O-shaped plate (hereinafter called "pipe-blank"), formed into a cylindrical shape by a forming process such as the U-O process (abbreviation of the U-ing/O-ing process) and the bending roll process, as shown in the schematic side view given in FIG. 1 for example, it is the usual practice to employ an inside welding machine equipped with a welding torch 1 attached to the free end of a boom 2 having a length at least equal to that of a pipe-blank 3 to be welded, the fixed end of said boom 2 being fixed to a carriage 4; to insert said boom 2 into said pipe-blank 3 in advance; and, to longitudinally seam-weld said pipe-blank 3 from the inside along the groove with a consumable electrode 5 fed through said welding torch 1, while moving said boom 2 by said carriage 4, together with a cable 9 serving to supply welding current to said consumable electrode 5, in the withdrawal direction from said pipe-blank 4, i.e., in the welding direction as indicated by an arrow in the drawing. An inside welding machine equipped with two welding torches 1 and 1, leading and trailing, and two consumable electrodes 5 and 5 is represented in FIG. 1. However, an inside welding machine may have one welding torch and one consumable electrode, or it may be provided with more than two welding torches and more than two consumable electrodes.

In the aforementioned conventional welding method of a pipe-blank, when adopting a welding process comprising using direct electric current as the welding current with a consumable electrode as the anode, such as the reversepolarity GMA welding process (GMA welding process is the abbreviation of the gas metal arc welding which comprises carrying out welding while shielding a molten metal and a welding arc produced in the space between the base metal and the consumable electrode from open air with shielding gases such as an inert gas and a carbon dioxide gas), as shown in the partially enlarged schematic drawing given in FIG. 2, the welding arc 6 from the consumable electrode 5 is deflected toward the upstream side of the welding direction indicated by an arrow in the drawing, i.e., in the opposite direction to that of welding, and takes the form as if it is drawn in by the molten metal 7. When the welding arc 6 takes the form as if it is drawn in by the molten metal 7 as mentioned above, the plasma jet stream produced at the tip of the consumable electrode 5 is also deflected toward the molten metal 7 and acts on said molten metal 7 as a dynamic pressure. This pushes said molten metal 7 away toward the upstream side of the welding direction, i.e., in the opposite direction to that of welding. As a result, the space below the consumable electrode 5 becomes substantially dry without molten metal, thus impairing the affinity between molten droplets from the consumable electrode 5 and the base metal at the groove of the pipe-blank 3. Welding defects such as undercut of bead, humping bead and lack of fusion of base metal tend to easily occur. In addition, frequent occurrence of boiling and spattering in the molten metal 7 tends to result in a deteriorated appearance of the weld bead. When the welding arc 6 is deflected as described above, furthermore, the tip of the consumable electrode 5 is melted only one one side as shown in FIG. 2. Under such circumstances, the transfer mode of molten droplets from the consumable electrode 5 cannot be a desirable spray transfer, but takes an undesirable mixed form of globular transfer and short-circuit transfer. As a result, coarse spatters are splashed with a crackling shot-circuiting noise and are deposited on the weld bead surface, thus leading to a deteriorated appearance of the weld bead. What is worse, splashed spatters are deposited on the opening at the tip of the shielding nozzle (not shown) of the welding torch to disturb the gas shield and entangle the air. In this case, it may practically be impossible to carry out welding.

The above-mentioned deflection of the welding arc toward the upstream side of the welding direction, i.e., in the opposite direction to that of welding, and the resulting irregular weld bead and welding defects are not limited only in the case of the conventional GMA welding process, but occur also in the case of the submerged-arc welding process using direct electric current as the welding current. In both cases, it has been difficult to obtain a beautiful and sound weld free from welding defects.

With a view to making basic considerations on the irregular weld bead and welding defects such as undercut of the bead, humping bead, lack of fusion of base metal and spattering, observed in longitudinally seam-welding a pipe-blank for welded steel pipe from inside along a groove by the conventional welding process as mentioned above, and to clarifying causes thereof, the inventors have made intensive studies. As a result, it has been found that the occurrence of said irregular weld bead and welding defects is attributable to the deflection of a plasma jet stream toward a molten metal caused by the deflection of a welding arc, and also that said deflection of the welding arc is brought about by a line of magnetic force produced by the direct electric current for welding flowing through a cable introduced into the pipe-blank.

More specifically, for instance, in longitudinally seam-welding a pipe-blank for welded steel pipe from the inside along a groove by the conventional reverse-polarity GMA welding process comprising using direct electric current as the welding current with a consumable electrode as the anode, direct electric current for welding flows, as shown in the partial cutaway schematic side view given in FIG. 3, in the opposite direction to that of welding indicated by an arrow in the drawing, through a cabtyre cable 9 introduced into the pipe-blank 3.

Therefore, a line of magnetic force 10, which is clockwise as viewed from the right-hand side of the drawing, is produced by said direct electric current, and a strong magnetic field is formed around said cable 9. As a result, said pipe-blank 3 is strongly magnetized in the same clockwise direction 11 as that of the line of magnetic force 10 by said magnetic field, thus causing leakage of a strong line of magnetic force from the groove of said pipe-blank 3, and a strong magnetic field is formed at said groove. When welding a groove where such a strong magnetic field is formed, the welding arc from a consumable electrode 5, which is a flow of charged corpuscle, is deflected by said strong magnetic field at the groove. This phenomenon is called the magnetic arc blow of the welding arc.

The relation between the direction of the electric current flowing through a welding arc, the magnetizing direction at the groove of a pipe-blank and the direction of the force acting on said welding arc at said groove is illustrated in the vector diagrams of FIGS. 4A and 4B. In these drawings, A is the direction of the electric current flowing in the welding arc 6 through the consumable electrode 5; B is the magnetizing direction at the groove of the pipe-blank 3; C is the welding direction; and F is the direction of the force acting on said welding arc 6. As shown in FIGS. 4A and 4B, the direction F of the force acting on the welding arc 6 is the same as that of the direct electric current for welding flowing through the cable 9 (refer to FIG. 3) and is opposite to the welding direction C. As described above with reference to FIG. 2, therefore, the welding arc 6 is deflected toward the upstream side of the welding direction C, i.e., in the opposite direction to that of welding C, thus resulting in such irregular weld bead and welding defects as undercut of the bead, humping bead, lack of fusion of base metal and spattering.

The above-mentioned magnetic arc blow of the welding arc is widely observed when applying the arc welding process using direct electric current as the welding current.

The inventors have heretofore proposed, based on the aforementioned finding, a welding method which comprises, in longitudinally seam-welding a pipe-blank for welded steel pipe from the inside along a groove by the reverse-polarity GMA welding process comprising using direct electric current supplied to a consumable electrode through a cable as the welding current with said consumable electrode as the anode, setting the direction of said direct electric current for welding flowing through said cable introduced into said pipe-blank in the same direction as that of welding, thereby preventing magnetic arc blow of the welding arc from said consumable electrode toward the upstream side of the welding direction, i.e., in the opposite direction to that of welding (hereinafter called "the first prior art") in Japanese Patent Application No. 31,392/76.

In Japanese Patent Publication No. 19,696/69, also, an apparatus for preventing magnetic arc blow of the welding arc is disclosed, which comprises, in longitudinally seam-welding a workpiece by the arc welding process comprising using direct electric current as the welding current, placing a magnetic body at a position closest to a welding electrode, in contact with or as close as possible to said workpiece, across a groove of said workpiece (hereinafter called "the second prior art"). According to said second prior art, a magnetic flux produced by the direct electric current for welding is almost totally focussed into said magnetic body, and the welding arc is not affected by the magnetic flux, whereby the magnetic arc blow of the welding arc is prevented.

According to the above-mentioned first and second prior arts, in longitudinally seam-welding a pipe-blank from the inside along a groove, it is possible to avoid an adverse effect of magnetic arc blow of the welding arc, and hence to obtain a beautiful and sound weld free from defects.

However, even in the case where, after a pipeblank is longitudinally seam-welded from inside along a groove by said first and second prior arts, said pipeblank is longitudinally seam-welded from the outside along said groove, a magnetic arc blow of the welding arc as mentioned above often occurs, thus causing boiling and spattering of molten metal. The appearance of the resulting weld bead tends to be deteriorated, and moreover, this leads to another problem of easy occurrence of such welding defects as undercut of the bead and lack of fusion of base metal.

This is considered attributable to the fact that, while the line of magnetic force 10 shown in FIG. 3 disappears immediately after the completion of longitudinal seam-welding of the pipe-blank from the inside along the groove, said pipe-blank itself has in general a considerable coercive force, and retains therefore a considerable residual magnetism for a long period of time. Consequently, in longitudinally seam-welding the pipe-blank from outside along the groove, which is previously longitudinally seamwelded from the inside, said residual magnetism causes a magnetic arc blow of the welding arc.

The aforementioned adverse effect of residual magnetism not only occurs in the case where a pipe-blank is longitudinally seam-welded on both sides from the inside and outside along a groove, but also is known to occur in the case where a pipeline is formed by successively butt-welding welded steel pipes, in the axial direction thereof, manufactured by longitudinally seam-welding pipe-blanks on one side from the inside along a groove.

SUMMARY OF THE INVENTION

An object of the present invention is therefore to provide a very simple and easy method, in longitudinally seam-welding a pipe-blank for welded steel pipe from the inside along a groove by the arc welding process comprising using direct electric current supplied to a consumable electrode through a cable as the welding current, for eliminating a residual magnetism in said pipe-blank produced by said direct electric current for welding flowing through said cable introduced into said pipe-blank.

In accordance with one of the features of the present invention, there is provided a method, in longitudinally seam-welding a pipe-blank for welded steel pipe from the inside along a groove by the arc welding process comprising using direct electric current supplied to a consumable electrode through a cable as the welding current, for eliminating a residual magnetism in said pipe-blank produced by said direct electric current for welding flowing through said cable introduced into said pipe-blank; said method comprising:

switching over reversely the polarity of said consumable electrode applied for said longitudinal seam-welding after the completion of said longitudinal seam-welding; and causing a direct electric current for eliminating magnetism to flow through said cable in the opposite direction to that of said direct electric current for welding by igniting again an arc from said consumable electrode on a tab plate attached to the end of said pipe-blank on the completion side of said longitudinal seam-welding, thereby eliminating said residual magnetism in said pipe-blank.

DETAILED DESCRIPTION OF PREFERRED EMBODIMENTS

Figure 1:
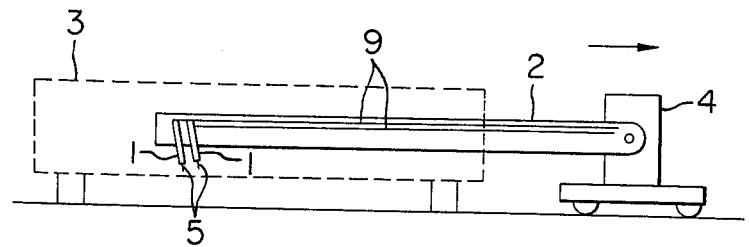
FIG. 1 is a schematic side view illustrating a conventional method for longitudinally seam-welding a pipe-blank for welded steel pipe from the inside along a groove and an apparatus for the implementation thereof.
Figure 2:
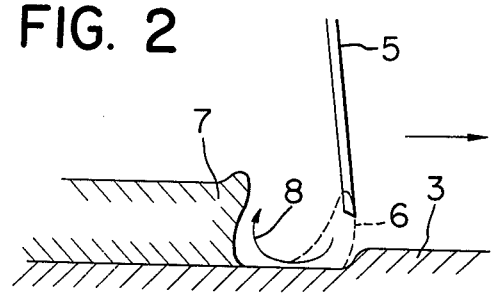
FIG. 2 is a partially enlarged schematic drawing illustrating a form of welding in the conventional reverse-polarity GMA welding process comprising using direct electric current as the welding current with a consumable electrode as the anode.
Figure 3:
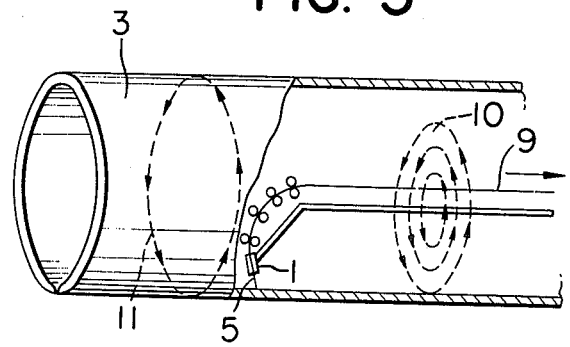
FIG. 3 is a partial cutaway schematic side view illustrating a form of welding in longitudinally seam-welding a pipe-blank for welded steel pipe from the inside along a groove by said conventional reverse-polarity GMA welding process.
Figure 4A:
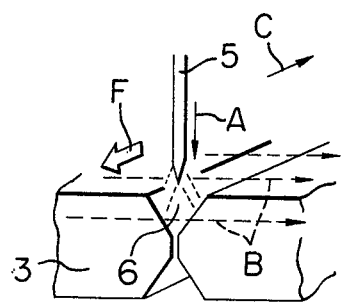
FIGS. 4A and 4B are vector diagrams illustrating the relation between the direction of the electric current flowing through a welding arc, the magnetizing direction at the groove of a pipe-blank for welded steel pipe, and the direction of the force acting on said welding arc at said groove in said conventional reverse-polarity GMA welding process.
Figure 4B:
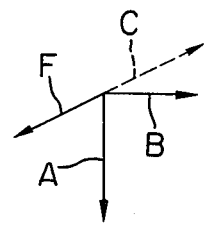

The present invention has been made based on the aforementioned recognition, and comprises, in longitudinally seam-welding a pipe-blank for welded steel pipe from the inside along a groove by the arc welding process comprising using direct electric current supplied to a consumable electrode through a cable as the welding current, switching over reversely the polarity of said consumable electrode applied for said longitudinal seam-welding after the completion of said longitudinal seam-welding; and causing a direct electric current for eliminating magnetism to flow through said cable in the opposite direction to that of said direct electric current for welding by igniting again an arc of said consumable electrode on a tab plate attached to the end of said pipe-blank on the completion side of said longitudinal seam-welding, thereby eliminating a residual magnetism in said pipe-blank produced by said direct electric current for welding flowing through said cable introduced into said pipe-blank is applying said longitudinal seam-welding.

More specifically, let us take up as an example the case where a pipe-blank for welded steel pipe is longitudinally seam-welded from the inside along a groove by the reverse-polarity arc welding process comprising using direct electric current as the welding current with a consumable electrode as the anode. Said longitudinal seam-welding is carried out by the method shown by dotted lines on the right-hand side of FIG. 5. That is, said pipe-blank is longitudinally seam-welded from the inside along the groove in the direction from right to left in the drawing, by a consumable electrode 5 fed through a welding torch 1, while inserting a boom 2, together with a cable 9 for supplying direct electric current for welding to said consumable electrode 5, into said pipe-blank 3 by a carriage (not shown) from the right-hand side of the drawing, said boom 2 being fixed to said carriage at the fixed end thereof, provided with said welding torch 1 at the free end thereof, and having a length longer than that of the pipe-blank 3.

When longitudinally seam-welding a pipe-blank for welded steel pipe along a groove, the occurrence of welding defects which tend to be produced near the starting and ending portions of welding, is prevented by attaching a tab plate to the pipe ends on the starting and ending sides of welding, starting welding from the tab plate on the starting side of welding by igniting a welding arc from a consumable electrode on said tab plate, and completing welding on the tab plate on the ending side of welding by carrying on welding up to said tab plate.

Figure 5:
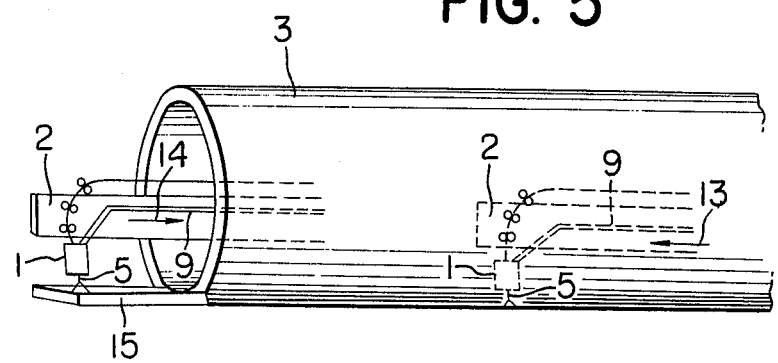
FIG. 5 is a schematic side view illustrating an embodiment of the method of the present invention.

In the method of the present invention, therefore, the polarity of said consumable electrode 5 is switched over from the reverse polarity applied during said longitudinal seam-welding, i.e., positive in polarity to negative in polarity, when said welding torch 1 reaches the tab plate 15 attached to the pipe end on the ending side of welding of said pipe-blank 3, as shown by solid lines on the left-hand side of FIG. 5, at the end of the longitudinal seam-welding of said pipe-blank 3 from the inside along the groove, and a direct electric current for eliminating magnetism is caused to flow, through said cable introduced into said pipe-blank 3, for a short period of time of from 0.5 to 30 seconds, in the opposite direction to that of the direct electric current for welding 13, as shown by an arrow 14, by igniting again a welding arc from said consumable electrode 5 on said tab plate 15.

Figure 6:
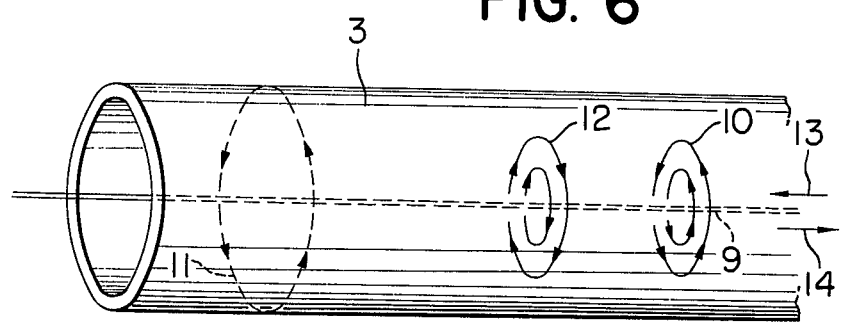
FIG. 6 is a schematic side view illustrating the relation between the direction of the direct electric current for welding and the direct electric current for eliminating magnetism and the direction of lines of magnetic force produced by said direct electric current in said embodiment of the method of the present invention.

In the above-mentioned method of the present invention, as shown in FIG. 6, the direct electric current for welding flows through the cable 9 introduced into a pipe-blank 3 in the direction indicated by an arrow 13 during the longitudinal seam-welding of said pipe-blank 3 from the inside along the groove. Therefore, a line of magnetic force 10, which is clockwise as viewed from the right-hand side of the drawing, is produced by said direct electric current for welding. As a result, said pipe-blank 3 is strongly magnetized in the same clockwise direction 11 as that of the line of magnetic force 10, as previously described. Said pipe-blank 3 holds a considerable residual magnetism for a long period of time, also as described previously. In the method of the present invention, as described above, the polarity of said consumable electrode is switched over from the reverse polarity, i.e., positive in polarity to negative in polarity, immediately after the completion of said longitudinal seam-welding of said pipe-blank from inside along the groove, and an arc from said consumable electrode is ignited again on the tab plate attached to the end of said pipe-blank on the ending side of welding. As shown in FIG. 6, therefore, a direct electric current for eliminating magnetism flows through said cable 9 in the direction indicated by an arrow 14, opposite to the direction of said direct electric current for welding 13. Said direct electric current for eliminating magnetism thus produces a counter-clockwise line of magnetic force 12, as viewed from the right-hand side of the drawing, in the direction opposite to that of the line of magnetic force 10, i.e., that of magnetization 11 of said pipe-blank 3. As a result, said residual magnetism in said pipe-blank 3 is eliminated.

For the above-mentioned direct electric current for eliminating magnetism, an energizing time of from 0.5 to 30 seconds is desirable. More specifically, after longitudinally seam-welding a pipe-blank, from the inside along a groove, having a wall thickness of 1 inch, an outside diameter of 48 inches and a length of 12 meters, with the use of direct electric current for welding of 1,500 A, if the energizing time of the direct electric current for eliminating magnetism exceeds about 3 seconds with a direct electric current for eliminating magenetism of 1,500 A, or about 10 seconds in the case with 800 A, or about 30 seconds in the case with 400 A, said pipe-blank becomes strongly and undesirably magnetized in the reverse direction. With an energizing time of under 0.5 seconds, on the other hand, the residual magnetism cannot be fully eliminated from the pipe-blank.

Also in FIG. 5, in the case where a boom 2 is previously inserted, together with the cable 9, into a pipe-blank 3, and said pipe-blank 3 is longitudinally seam-welded from the inside along a groove in the direction from left to right in the drawing by a consumable electrode 5 fed through a welding torch 1 while withdrawing said boom 2 by a carriage (not shown) from said pipe-blank 3, the polarity of said consumable electrode 5 is switched over from the reverse polarity, i.e., positive in polarity to negative in polarity on a tab plate (not shown) attached to the right-hand end of said pipe-blank 3 in the drawing, and a direct electric current for eliminating magnetism is supplied in the manner as mentioned above.

In the method of the present invention, when a consumable electrode used for longitudinally seam-welding a pipe-blank from the inside along a groove is of the reverse-polarity, i.e., positive in polarity, the polarity of said consumable electrode is switched over to negative in polarity, to supply a direct electric current for eliminating magnetism. If, however, the consumable electrode used for said longitudinal seam-welding is negative in polarity, a direct electric current for eliminating magnetism may well be supplied after switching over the polarity of said consumable electrode to the reverse-polarity, i.e., positive in polarity.

Now, the method of the present invention is described in more detail by way of an example.

EXAMPLE

In longitudinally seam-welding a pipe-blank, from the inside along a groove, having a wall thickness of 1 inch, an outside diameter of 48 inches and a length of 12 meters by the reverse-polarity GMA welding process comprising using direct electric current as the welding current with a consumable electrode as the anode, the conventional welding method described above with reference to FIG. 5 was applied, in which, as shown in FIG. 5, said pipe-blank was longitudinally seam-welded from the inside along the groove in the direction from right to left in the drawing, by a consumable electrode 5 fed through a welding torch 1 while inserting a boom 2, together with a cable 9 for supplying direct electric current for welding to said consumable electrode 5, into said pipe-blank 3 by a carriage (not shown) from the right-hand side in the drawing, said boom 2 being fixed to said carriage at the fixed end thereof and provided with said welding torch 1 at the free end thereof.

Then, the method of the present invention for eliminating residual magnetism was applied to said pipe-blank 3, said method comprising switching over the polarity of said consumable electrode 5 from the reverse-polarity as applied during said welding, i.e., positive in polarity to negative in polarity immediately after the completion of said longitudinal seam-welding, and igniting again an arc from said consumable electrode 5 for 1 second on a tab plate 15 attached to the end of said pipe-blank 3 on the ending side of welding. In this example, both the direct electric current for welding and the direct electric current for eliminating magnetism were of 1,500 A.

Residual magnetism on the exterior of the groove of said pipe-blank 3 was measured after the completion of said elimination treatment of residual magnetism. The results of this measurement are given in Table 1. For comparison purposes, Table 1 also shows the residual magnetism as measured on the corresponding parts of said pipe-blank 3 before the application of said elimination treatment of residual magnetism.

Table 1

| | Measuring positions of residual magnetism on the exterior of the groove of the pipe-blank after longitudinal seam-welding from inside | | |
|---|---|---|---|
| | Pipe-blank end on starting side of welding | Middle of pipe-blank | Pipe-blank end on ending side of welding |
| Residual magnetism before elimination treatment (Gauss) | 65 | 78 | 94 |
| Residual magnetism after elimination treatment (Gauss) | 10 | 8 | 10 |

As is evident from Table 1, it was ascertained that residual magnetism of a pipe-blank is largely reduced by the application of the method for eliminating residual magnetism of the present invention. Also, in case where a direct electric current for eliminating magnetism of 800 A was supplied for 8 seconds, and in a case where a direct electric current for eliminating magnetism of 400 A was supplied for 25 seconds, similarly good results were obtained.

Then, said pipe-blank subjected to the elimination treatment of residual magnetism was longitudinally seam-welded from the outside along the groove. No magnetic arc blow of the welding arc was produced, and the transfer mode of molten droplets from the consumable electrode took the form of desirable spray transfer. Therefore, it was possible to carry on welding in a satisfactory condition. As a result, a beautiful and uniform weld bead was formed on the exterior surface of the groove of said pipe-blank, and no welding defects were observed in an X-ray test. It was thus confirmed that a very sound weld can be obtained.

The above-mentioned example has covered a case where a pipe-blank was longitudinally seam-welded from both the inside and outside along a groove to manufacture a welded steel pipe. Also in the case where one-sided longitudinal seam-welding is applied to a pipe-blank only from the inside to manufacture a welded steel pipe, it is possible, in forming a pipeline by successively butt-welding the manufactured welded steel pipes in the axial direction thereof, to carry out said butt-welding with no trouble, without the occurrence of a magnetic arc blow of the welding arc caused by residual magnetism, by only applying the method for eliminating magnetism of the present invention after the completion of said longitudinal seam-welding.

According to the method of the present invention, as described above in detail, it is possible, in longitudinally seam-welding a pipe-blank for welded steel pipe from the inside along a groove by the arc welding process comprising using direct electric current supplied to a consumable electrode through a cable, to eliminate very simply and very easily the residual magnetism in said pipe-blank produced by said direct electric current for welding flowing through said cable introduced into said pipe-blank. No magnetic arc blow of the welding arc caused by a residual magnetism is therefore produced not only in the case where a pipe-blank is longitudinally seam-welded both from the inside and outside along a groove to manufacture a welded steel pipe, but also in the case where welded steel pipes manufactured by longitudinally seam-welding pipe-blanks only from the inside along a groove are successively butt-welded in the axial direction thereof to form a pipeline. It is therefore possible to obtain a beautiful weld free from welding defects without any trouble, thus providing industrially useful effects.

What is claimed is:

1. In longitudinally seam-welding a pipe-blank for welded steel pipe from the inside along a groove by the arc welding process comprising attaching a tab plate to at least a terminal end of said pipe-blank, supplying a direct electric current for welding to a consumable electrode through a cable, and moving said consumable electrode from a first end of the pipe-blank to the terminal end of the pipe-blank while effecting seam-welding, a method for eliminating a residual magnetism in said pipe-blank produced by said direct electric current for welding flowing through said cable introduced into said pipe-blank, which method comprises:

reversing the polarity of said consumable electrode to a polarity opposite to that used for said longitudinal seam-welding, when said consumable electrode is adjacent said tab plate at the terminal end of the pipe-blank subjected to said longitudinal seam-welding, for causing a direct electric current for eliminating magnetism to flow through said cable in the opposite direction to that of said direct electric current for welding, thereby eliminating said residual magnetism in said pipe-blank.

2. The method of claim 1, wherein said consumable electrode applied for said longitudinal seam-welding is positive in polarity, and the polarity of said consumable electrode is switched over to negative polarity for eliminating said magnetism, said direct electric current for eliminating said magnetism being supplied through said cable.

3. The method of claim 2, wherein the energizing time of said direct electric current for eliminating magnetism is in a range from 0.5 to 30 seconds.

4. The method of claim 1, wherein said consumable electrode applied for said longitudinal seam-welding is negative in polarity, and the polarity of said consumable electrode is switched over to positive polarity for eliminating said magnetism, said direct electric current for eliminating said magnetism being supplied through said cable.

5. The method of claim 4, wherein the energizing time of said direct electric current for eliminating magnetism is in a range from 0.5 to 30 seconds.

6. The method of claim 1 comprising igniting an arc from said consumable electrode to said tab plate when said polarity of said consumable electrode is reversed.

7. The method of claim 1, wherein the energizing time of said direct electric current for eliminating magnetism is in a range from 0.5 to 30 seconds.

* * * * *